United States Patent
Serrot Hauke et al.

(10) Patent No.: US 9,868,548 B2
(45) Date of Patent: Jan. 16, 2018

(54) TAKE-OFF SYSTEM AND METHOD FOR UNMANNED AERIAL VEHICLES

(71) Applicant: The Boeing Company, Chicago, IL (US)

(72) Inventors: Enrique Emilio Serrot Hauke, Madrid (ES); Eduardo Gabriel Ferreyra, Madrid (ES); Jose Luis Lemus, Madrid (ES); Jose Antonio Blanco Del Alamo, Madrid (ES); Nieves Lapena Rey, Madrid (ES)

(73) Assignee: The Boeing Company, Chicago, IL (US)

( * ) Notice: Subject to any disclaimer, the term of this patent is extended or adjusted under 35 U.S.C. 154(b) by 0 days.

(21) Appl. No.: 14/955,945

(22) Filed: Dec. 1, 2015

(65) Prior Publication Data

US 2016/0167804 A1   Jun. 16, 2016

Related U.S. Application Data

(63) Continuation-in-part of application No. 14/610,847, filed on Jan. 30, 2015.

(30) Foreign Application Priority Data

Dec. 16, 2014 (EP) .................................. 14382523

(51) Int. Cl.
*B64F 1/08* (2006.01)
*B64C 39/02* (2006.01)

(52) U.S. Cl.
CPC .............. *B64F 1/08* (2013.01); *B64C 39/024* (2013.01); *B64C 2201/08* (2013.01)

(58) Field of Classification Search
CPC ...... B64F 1/04; B64F 1/08; B64F 1/10; B64C 2201/08; B64C 2201/084
See application file for complete search history.

(56) References Cited

U.S. PATENT DOCUMENTS 1,415,847 A    5/1922   Sperry
2,234,751 A    3/1941   Fleet et al.
(Continued)

FOREIGN PATENT DOCUMENTS

DE    9306655 U1    8/1993
FR    1432258 A    3/1966
(Continued)

OTHER PUBLICATIONS

Anonymous: "Dolly—RC Groups", Jul. 30, 2007 (Jul. 30, 2007), XP055134473, Retrieved from the Internet: URL: http://www.rcgroups.com/forums/showthread.php?t=720243 [retrieved on Aug. 12, 2014].

(Continued)

*Primary Examiner* — Richard R Green
(74) *Attorney, Agent, or Firm* — Miller, Mathias & Hull LLP (57) ABSTRACT

An unmanned aerial vehicles take-off system may include at least one winch, at least one towline, at least one dolly on which at least one aircraft is mounted, and at least one battery of the at least one winch. At least one microcontroller unit is connected to the at least one winch, wherein the at least one microcontroller unit is configured to control the activation/deactivation of the at least one winch. An unmanned aerial vehicle take-off method is also disclosed that includes operating the at least one winch by means of at least one microcontroller unit connected to said at least one winch.

17 Claims, 4 Drawing Sheets

(56) References Cited

U.S. PATENT DOCUMENTS

| | | | |
|---|---|---|---|
| 2,390,667 A | 12/1945 | Sengbusch | |
| 2,390,677 A * | 12/1945 | Alkan et al. | B64F 1/06 |
| | | | 244/63 |
| 3,163,380 A | 12/1964 | Brodie | |
| 3,599,905 A | 8/1971 | Strance | |
| 7,165,745 B2 | 1/2007 | McGeer et al. | |
| 8,006,958 B2 * | 8/2011 | Starks | B66D 3/20 |
| | | | 254/323 |
| 8,894,006 B2 * | 11/2014 | Jones | B64F 1/06 |
| | | | 244/63 |
| 2015/0060600 A1 | 3/2015 | Tully et al. | |

FOREIGN PATENT DOCUMENTS

| | | |
|---|---|---|
| GB | 2132577 A | 7/1984 |
| WO | 2005058698 A1 | 6/2005 |
| WO | 2012025653 A1 | 3/2012 |

OTHER PUBLICATIONS

"Topmodel CZ—Sailplane Take-off Dolly II", Aug. 12, 2014 (Aug. 12, 2014), XP0055134501, Retrieved from the Internet: URL: http://www.topmodelcz.cz./index.php? &desktop_back=eshop &action_back=&id_back=&desktop=eshop&action=zbozi_detail &id_18028[retrieved on Aug. 13, 2014].

European Search Report application No. EP 14382523 dated May 21, 2015.

European Search Report application No. EP 14382030.5 dated Aug. 22, 2014.

Office Action for related U.S. Appl. No. 14/610,847; dated May 13, 2016.

* cited by examiner

TAKE-OFF SYSTEM AND METHOD FOR UNMANNED AERIAL VEHICLES

CROSS-REFERENCE TO RELATED APPLICATION

This application is a continuation-in-part of U.S. patent application Ser. No. 14/610,847, filed Jan. 30, 2015.

FIELD OF THE DISCLOSURE

The present disclosure presents a method and a system for the take-off of Unmanned Aerial Vehicles (UAV's), which makes use of a winch and a dolly for the UAV to gain enough velocity so that it is able to take-off leaving the dolly.

The system and method of the present disclosure are applicable in the field of Aeronautic Engineering and, more particularly, in the field of UAV-related Electronics and Automatic Regulation.

BACKGROUND OF THE DISCLOSURE

Take-off of Unmanned Aerial Vehicles (UAV's) is in some cases performed by using a winch towing a dolly on which the aircraft is mounted and carried until its speed is high enough to rotate and take-off. This method is used in order to save energy for the flight and/or to keep a clean and lighter configuration of the aircraft, avoiding the use of a heavy and bulky landing gear. The use of this method usually involves a winch operator, who must coordinate with the manual pilot in order to start the system just prior to the take-off and to stop it once the plane has lifted off from the dolly. A system like the one previously described is disclosed in European Patent application EP 14382030.6.

However, the system disclosed in the mentioned patent application involves, as has been said, a dedicated person who is in charge of managing the winch and coordinating with the aircraft's pilot (be it a manual pilot, an autopilot, or a Ground Control Station (GCS)) in order to perform a safe take-off for the aircraft. Apart from the fact of this task being quite cumbersome for a human winch operator, there are several safety aspects that must be taken into consideration when analyzing the performance of a system like the one mentioned above.

First, one should notice the possible misunderstandings that may occur among the aircraft's pilot and the winch operator during take-off maneuvers. Second, and more importantly, any emergencies or malfunctions arising during a take-off maneuver have to be rapidly recognized and communicated from the aircraft's pilot to the winch operator, in order for the winch operator to stop the winch so that it does not continue towing the dolly, thus aborting the take-off in time. The response time in these events is critical, and it is important that it be as short as possible, preferably not exceeding a few seconds.

Other safety aspects that should be taken into consideration when managing a system like the one previously described, is the necessity of checking the winch battery level, to ensure, prior to the aircraft's take-off, that the battery level is high enough to carry on an entire take-off cycle, which involves deploying and further rolling up of the towline.

Measuring the deployed towline is another task which is crucial for a safe take-off, because this allows knowing the runway available for the dolly, in order for the aircraft to have sufficient time to gain velocity and take off. This task must also be carried out by the winch operator in the system described above.

In the cases where aborting the take-off of the aircraft is necessary, one should bear in mind that the conditions surrounding the aircraft might be unexpectedly worse than usual (such as wind gusts or ambient noise that may influence communication between the pilot and the winch operator). This implies the criticality of a prompt response taken by the aircraft, and the necessity of good communication channels among the pilot and the winch operator. However, a rapid and timely response may sometimes be difficult to achieve, which can lead to a failed take-off and damage to the aircraft.

SUMMARY OF THE DISCLOSURE

In order to provide an enhanced solution that avoids the problems mentioned above, the present disclosure provides a novel system and corresponding method for the take-off of Unmanned Aerial Vehicles (UAV's).

According to an embodiment of the system of the disclosure, the take-off system for Unmanned Aerial Vehicles comprises at least one winch, at least one towline, at least one dolly on which at least one aircraft is mounted, and at least one battery of the at least one winch.

According to an embodiment of the system of the disclosure, the take-off system additionally comprises at least one microcontroller unit connected to the at least one winch, wherein the at least one microcontroller unit is configured for controlling the take-off system. In particular, the microcontroller unit may be configured for controlling the activation/deactivation of the at least one winch. However, as already introduced, the microcontroller unit may be configured for monitoring and controlling several parameters regarding the performance of the whole take-off system, for example speeds and accelerations, distances, battery level and battery consumption rates, etc.

The take-off system of the disclosure, according to an embodiment thereof, also comprises at least one radio receiver unit connected to the at least one microcontroller unit, wherein the at least one microcontroller unit is configured to activate/deactivate the at least one winch at the reception (by the radio receiver unit) of corresponding signals from a radio transmitter. The radio transmitter may be the radio with which a pilot commands the UAV.

According to an embodiment of the system of the disclosure, the take-off system for Unmanned Aerial Vehicles comprises at least one display showing performance parameters of the at least one winch. The display may be, for example, a liquid crystal display.

The take-off system also comprises, according to an embodiment thereof, at least one encoder connected both to the at least one winch and to the at least one microcontroller unit, wherein the microcontroller unit is configured to count the number of roll-up cycles performed by the at least one winch from signals (typically pulses corresponding to winch turns) sent from the at least one encoder to the at least one microcontroller unit. According to an embodiment of the take-off system, the at least one microcontroller unit is configured to count the deployed distance of the at least one towline, from signals sent from the at least one encoder to the at least one microcontroller unit. The remaining take-off run available for the at least one dolly, within each take-off cycle, may also be counted by the at least one microcontroller unit (also configured therefor), from signals sent from the at least one encoder to the at least one microcontroller unit.

The at least one microcontroller unit is configured, according to an embodiment of the take-off system, to measure the rolling-up speed and acceleration of the towline, from signals sent from the at least one encoder to the at least one microcontroller unit.

Furthermore, according to an embodiment of the take-off system of the disclosure, the take-off system comprises at least one alarm indicator, for indicating that safety parameters concerning system performance are out of permitted limits. In particular, the alarm indicator may be configured to indicate that safety parameters concerning winch performance are outside of permitted limits.

As has already been introduced, the present disclosure also presents a take-off method for Unmanned Aerial Vehicles. The take-off method of the disclosure comprises using at least one dolly on which at least one aircraft is mounted and towing the at least one dolly by means of at least one winch. The take-off method comprises, according to an embodiment thereof, operating the at least one winch by means of at least one microcontroller unit connected to said at least one winch.

Thus, according to an embodiment of the take-off method for Unmanned Aerial Vehicles (UAV's), which preferably makes use of a take-off system comprising the at least one dolly on which at least one aircraft is mounted, the at least one winch towing the at least one dolly by means of at least one towline, at least one battery of the at least one winch and at least one encoder connected both to the at least one winch and to the at least one microcontroller unit, the method further comprises:

initializing the take-off system;
checking level of the battery of the winch;
checking number of roll-up cycles performed by the winch;
deploying the towline from the winch;
incrementing count of deployed towline distance, by means of the at least one microcontroller unit, by means of signals sent from the at least one encoder (connected to the at least one winch) to the at least one microcontroller unit;
incrementing take-off run count as a function of the deployed towline distance;
arming the system for take-off;
detecting, by means of at least one radio receiver unit connected to the at least one microcontroller unit, a first radio signal comprising a take-off command, the first radio signal sent from a radio transmitter to the aircraft;
activating the winch;
starting the take-off sequence;
checking the rolling-up acceleration of the towline;
checking the remaining take-off run available for the dolly;
detecting, by means of the at least one radio receiver unit, a second radio signal comprising a lift-up command, the second radio signal sent from a radio transmitter to the aircraft;
ending the take-off sequence.

According to an embodiment of the take-off method, the method finishes without starting the take-off sequence if, after checking the winch battery level, it is found that said winch battery level is under a certain predetermined limit.

Also according to an embodiment of the take-off method, the method finishes without starting the take-off sequence if, after checking the number of roll-up cycles performed by the winch, it is found that said number of roll-up cycles performed by the winch is above a certain predetermined limit.

According to an embodiment of the method, at least one alarm indicator of the take-off system indicates that the winch battery level is under a certain predetermined limit and/or at least one alarm indicator indicates that the number of roll-up cycles performed by the winch is above a certain predetermined limit.

In an embodiment of the method, if after checking the rolling-up acceleration of the towline it is found that the rolling-up acceleration of the towline is under or above certain predetermined acceleration values, the winch stops rolling up the towline and the method finishes aborting the aircraft's take-off. Also, if after checking the remaining take-off run available for the dolly it is found that the remaining take-off run available for the dolly is under a certain predetermined distance value, the winch stops rolling up the towline and the method finishes aborting the aircraft's take-off.

The method finishes, according to an embodiment thereof, after a predetermined period of time from detecting the second radio signal comprising the lift-up command. Thus, the winch stops rolling-up the towline and towing the dolly.

Moreover, if no second radio signal comprising a lift-up command is detected by the radio receiver unit, the method returns to the step of checking the rolling-up acceleration of the towline.

The method finishes aborting the aircraft's take-off if a stop command is detected by the radio receiver unit at any time.

BRIEF DESCRIPTION OF THE DRAWINGS

Embodiments of the present disclosure, along with aspects of the prior art, will now be described with reference to the accompanying drawings, of which.

DETAILED DESCRIPTION

The following is a description of an embodiment of the system and method of the disclosure, making reference to the Figures.

Figure 1:
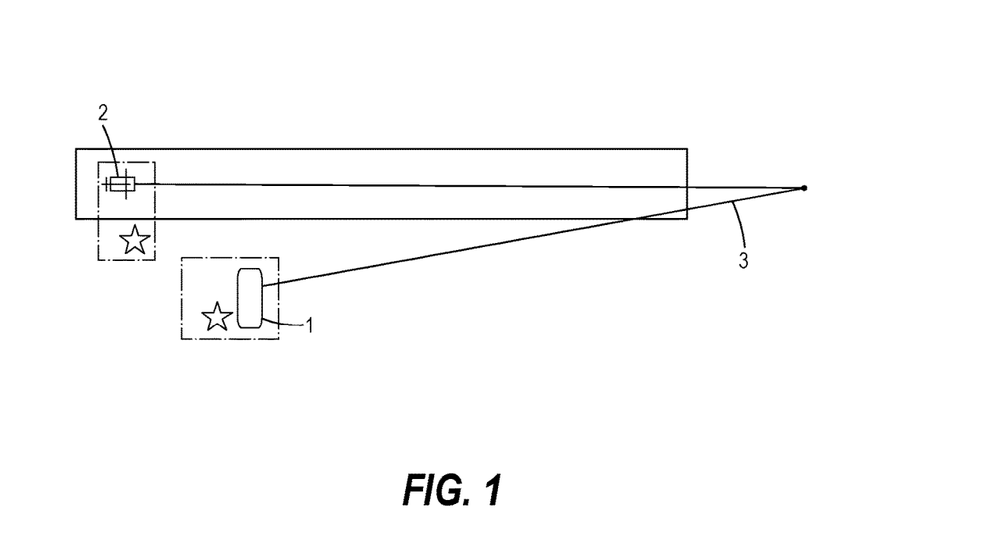
FIG. 1 is a schematic diagram of elements comprising current take-off systems for UAV's, involving the use of a winch and a dolly.

The present disclosure describes a system and a method for the take-off of Unmanned Aerial Vehicles (UAV's). The system is based on a conventional take-off system, schematically depicted in FIG. 1, comprising a dolly 2 towed by a towline 3 and a winch 1. The towline 3 extends from the winch 1, through a pulley, to the dolly (2). The stars shown in FIG. 1 represent the winch operator and the aircraft's pilot (a manual pilot, an auto-pilot or a Ground Control Station).

Figure 2:
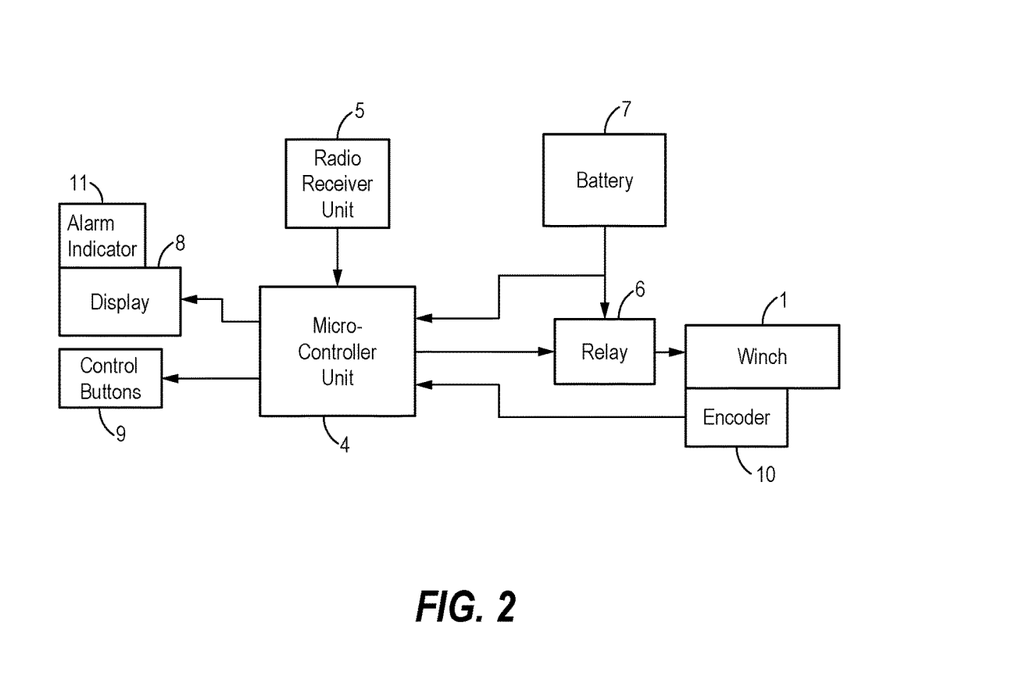
FIG. 2 is a schematic diagram of the main components of the take-off system for UAV's object of the present disclosure.

The system for the take-off of UAV's according to the present disclosure comprises:
a winch 1;
a dolly 2;
a towline 3;

a microcontroller unit 4;
a radio receiver unit 5;
an electronic relay 6;
a battery 7;
a display 8;
control buttons 9;
an encoder 10;
a Ground Control Station (GCS) and/or a Manual Pilot (MP).

Most of these elements are schematically depicted in FIG. 2.

Figure 3:
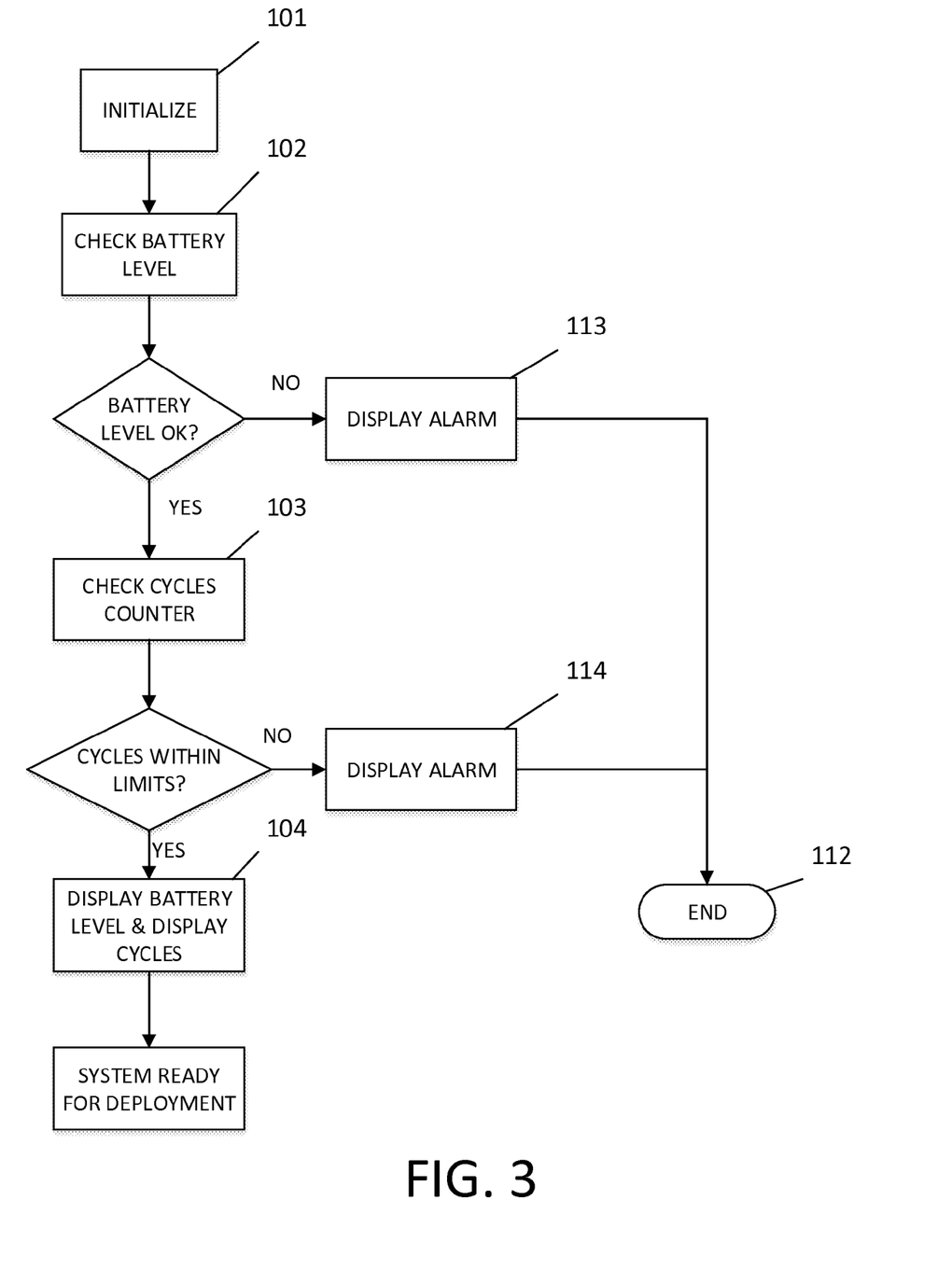
FIG. 3 is a first part of a flow chart comprising the main steps of the take-off method for UAV's.
Figure 4:
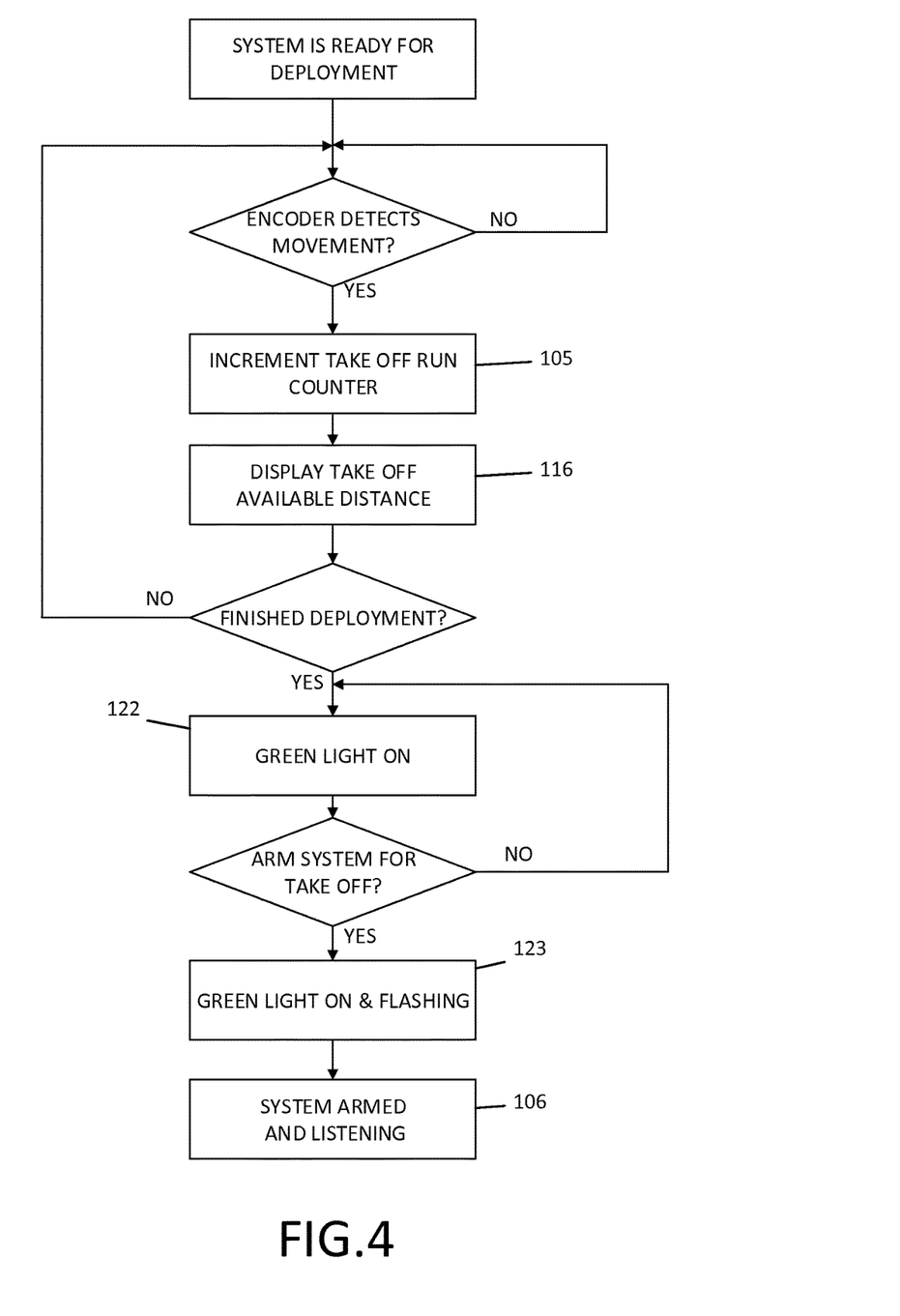
FIG. 4 is a second part of a flow chart comprising the main steps of the take-off method for UAV's.
Figure 5:
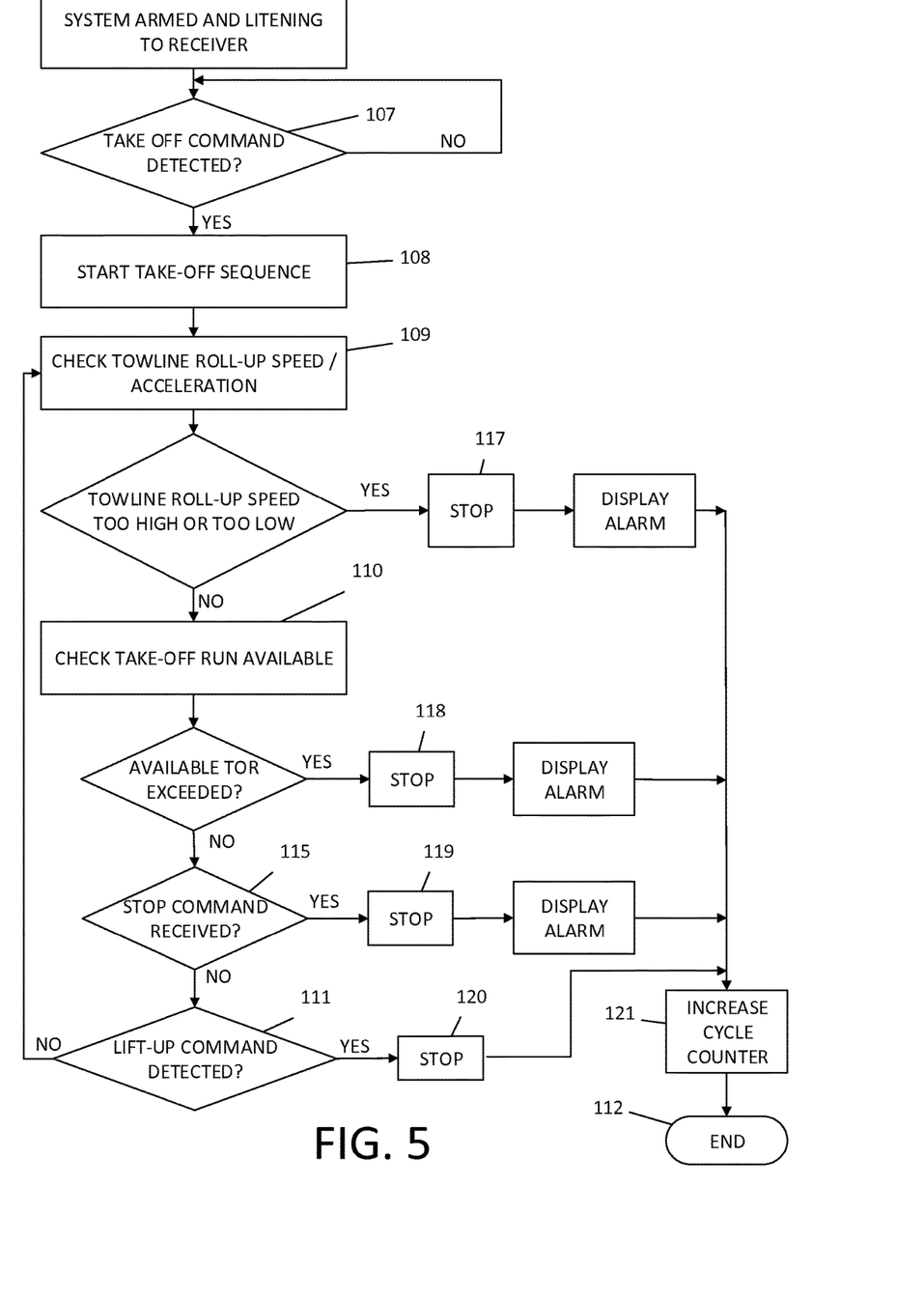
FIG. 5 is a third part of a flow chart comprising the main steps of the take-off method for UAV's.

Furthermore, the method for the take-off of UAV's according to the present disclosure typically comprises the following steps, schematically depicted in FIGS. 3, 4 and 5:

- initializing 101 the take-off system;
- checking 102 the level of the battery 7 of the winch 1;
- checking 103 the number of roll-up cycles performed by the winch 1;
- displaying 104 the battery 7 level on a display 8;
- displaying 104 on a display 8, either the number of roll-up cycles already performed by the winch 1 since its last inspection took place, or the number of roll-up cycles remaining until the next inspection of the winch 1 is due;
- deploying the towline 3 from the winch 1;
- incrementing 105, by means of the microcontroller unit 4 connected to the encoder 10 (which in turn is connected to the winch), the take-off run count as a function of the deployed towline 3 distance;
- arming 106 the take-off system for the take-off;
- receiving 107, by means of the radio receiver unit 5, a first radio signal from a radio transmitter, indicating the start of the take-off; a take-off command comprised within the first radio signal activates the winch 1;
- starting 108 the take-off sequence;
- checking 109 the rolling-up speed and/or acceleration of the towline 3, by means of the microcontroller unit 4 connected to the encoder 10;
- checking 110 the remaining take-off run (TOR) available for the dolly 2;
- checking 111 whether a second radio signal is received by the radio receiver unit 5, the second radio signal comprising a lift-up command for the aircraft;
- ending 112 take-off sequence.

Most of the above steps are typically performed automatically, by means of a take-off system as the one described at the beginning of this description of an exemplary embodiment. However, the step concerning the deployment of the towline 3 from the winch 1 is typically performed manually by a human operator. Additionally, it must be observed that the steps taking place between the starting 108 of the take-off sequence until the end 112 of the take-off sequence are performed sequentially, and they are repeated typically several times per second.

According to the method of the disclosure, when the take-off system is initialized 101, a battery check 102 is performed in order to ensure that the battery level of the winch 1 is sufficient to carry out the entire take-off sequence, so that there will be no risk that either the take-off suffers from a sudden stop, or the acceleration of the dolly 2 does not reach and maintain a value sufficient for the aircraft to reach the necessary take-off speed within the take-off run (TOR) available. If it is detected that the battery level is insufficient for the winch 1 to perform a reliable take-off of the UAV, then the take-off is aborted before it starts, and the method finishes 112. In this case, according to a preferred embodiment of the system and method of the disclosure, an alarm indicator 11 indicating insufficient battery level is activated 113 and/or shown on the display 8 of the take-off system.

On the contrary, if it is detected that the battery level is sufficient to correctly and safely perform the take-off of the UAV, then a check 103 is performed in order to verify whether the winch roll-up cycles have exceeded a predetermined value or cycles' limit. This limit establishes a safety threshold for the number of take-offs performed by the winch 1. If the number of roll-up cycles that have been carried out by the winch 1 exceeds the predetermined limit, that means the winch 1 should undergo an inspection before coming again into operation, and therefore the take-off is aborted before it starts, and the method finishes 112. In this case, according to an embodiment of the system and method of the disclosure, an alarm indicator 11 indicating that the number of take-off cycles (or roll-up cycles performed by the winch 1) has exceeded the predetermined limit, is activated 114 and/or shown on the display 8 of the take-off system.

If the system is inspected due to the number of roll-up cycles performed by the winch 1 exceeding the predetermined cycle limit, then, after having inspected the winch 1 (and making any necessary replacement or repairs of the winch's components), the count indicating the number of roll-up cycles performed by the winch 1 may be reset, starting a new count. This task is preferably performed by the microcontroller unit 4 and/or by an operator. According to an embodiment of the system and method of the disclosure, the battery level and the number of roll-up cycles already performed by the winch 1 are shown 104 in the take-off system's display 8.

After having verified that both the battery level and the number of roll-up cycles carried out by the winch 1 are within the limits permitted, the towline 3 is deployed. The encoder 10 sends signals to the microcontroller unit 4 which in turn counts the deployed towline distance. Thus, the microcontroller unit 4 calculates both the deployed distance of the towline 3 and the take-off run (TOR) available for the dolly 2 (as a function of the deployed towline distance). The take-off run (TOR) available for the dolly 2 is then typically depicted 116 on a display.

After having deployed the towline 3, the take-off system is armed 106, thus becoming ready for starting 108 the take-off sequence; the radio receiver unit 5 is activated, waiting for any radio signal that a manual pilot, an autopilot or a Ground Control System (GCS) in charge of controlling the UAV might transmit. According to an exemplary embodiment of the take-off system and method, after having deployed the towline 3, a light indicator (for example, a green light) is switched on 122; when arming the system, the green light starts flashing 123.

According to an embodiment of the method of the disclosure, the radio receiver unit 5 detects 107 a first radio signal, either sent from a manual pilot, an autopilot or a Ground Control Station (GCS), via any radio transmitter. This first radio signal informs the take-off system of the intention of the UAV pilot of starting the take-off. When a first radio signal indicating a take-off command is detected 107 by the radio receiver unit 4, the microcontroller unit 4 sends an order to the winch 1, via the electronic relay 6, thus activating the winch 1, which starts rolling up the towline 3 towing the dolly 2. Therefore, the dolly 2 starts accelerating while carrying the UAV.

A check 109 of the towline roll-up speed and/or acceleration is performed continuously by the microcontroller unit 4 (using the signals sent thereto by the encoder 10 connected to the winch 1), in order to verify that the take-off system is working properly (that is, the towline 3 is being rolled-up at a correct acceleration) and to ensure that the speed is sufficient for the UAV to lift up, so that the UAV can perform a safe take-off. By checking 109 the towline rolling-up speed/acceleration, it can be verified both that no obstacle is obstructing the acceleration of the dolly 2 (which would be indicated if the towline rolling-up speed/acceleration were under the predetermined speed limits), and that the towline 3 has not been disconnected from the dolly (2) (which would be indicated if the towline rolling-up speed/acceleration were above the predetermined speed limits). If after a predetermined amount of time, the towline roll-up acceleration is out of predetermined limits, the winch 1 stops 117 rolling up the towline 3, thus aborting the take-off of the UAV, and the method finishes 112.

When the rolling-up acceleration of the towline 3 is found to be within predetermined limits, then it is checked 110 whether the remaining take-off run (TOR) available is sufficient for the UAV to start rotating and perform a reliable and safe take-off. If the remaining take-off run (TOR) available is found not sufficient to ensure enough time for the UAV to start rotating and perform a safe take-off, the winch 1 stops 118 rolling up the towline 3, thus aborting the take-off, and the method finishes 112.

As mentioned above, the checking steps ranging from the starting 108 of the take-off sequence up to the end 112 of the take-off sequence may be performed continuously, typically several times per second.

When the manual pilot operates over an elevator channel of the dolly 2 in a nose up direction to rotate the aircraft for take-off, a second radio signal is detected 111 by the radio receiver unit 5 and then read by the microcontroller unit 4, which sends an order to the winch 1, via the electronic relay 6 to stop 120 rolling-up the towline 3 after a preprogrammed time, thereby to leave enough time for the aircraft to rotate and leave the dolly 2 for the climb.

If at any time during the take-off sequence a stop command explicitly indicating that the take-off must be aborted is detected 115 by the radio receiver unit 5, the winch 1 stops 119 rolling up the towline 3, thus aborting the take-off and finishing 112 the method. An aborted take-off may be performed by the manual pilot, the autopilot or the GCS by sending via radio a stop command, which is received 115 by the radio receiver unit 5, as described previously. Alternatively, the aborted take-off can be performed either by the manual pilot, the autopilot or the GCS, simply by not starting the rotation of the UAV. Thus, a second radio signal indicating a lift-up command is not detected 111 by the radio receiver unit 5 of the take-off system and the method continues by performing again checks 109, 110 of both the rolling-up speed of towline 3 and the remaining take-off run (TOR) available. If the latter is found insufficient, the winch 1 stops 118 rolling up the towline 3, thus aborting the take-off, and the method finishes 112.

As has been mentioned previously, according to a preferred embodiment of the take-off system, the take-off system comprises an electronic relay 6 through which the microcontroller unit 4 activates/deactivates the winch According to a preferred embodiment of the take-off method of the disclosure, the count indicating the number of roll-up cycles performed by the winch 1 is increased 121 before ending 112 the take-off sequence.

It will be appreciated that the foregoing description provides examples of the disclosed assembly and methods. However, it is contemplated that other implementations of the disclosure may differ in detail from the foregoing examples. All references to the disclosure or examples thereof are intended to reference the particular example being discussed at that point and are not intended to imply any limitation as to the scope of the disclosure more generally. All language of distinction and disparagement with respect to certain features is intended to indicate a lack of preference for those features, but not to exclude such from the scope of the disclosure entirely unless otherwise indicated.

Accordingly, this disclosure includes all modifications and equivalents of the subject matter recited in the claims appended hereto as permitted by applicable law. Moreover, any combination of the above-described elements in all possible variations thereof is encompassed by the disclosure unless otherwise indicated herein or otherwise clearly contradicted by context.

What is claimed is:

1. Take-off system for an unmanned aerial vehicle, comprising:
   a winch having an activation mode and a deactivation mode;
   a towline coupled to the winch;
   a dolly coupled to the towline;
   an aircraft mounted on the dolly;
   a microcontroller unit operably coupled to the winch and configured to control the activation and deactivation modes of the winch; and
   a radio receiver unit communicatively coupled to the microcontroller unit, wherein the radio receiver unit detects a first radio signal such that microcontroller unit controls the winch to operate in the activation mode based on receipt of the first radio signal, wherein the radio receiver unit detects a second radio signal comprising a lift-up command produced by a pilot of the unmanned aerial vehicle operating an elevator channel of the dolly in a nose-up direction to rotate the unmanned aerial vehicle for take-off, and wherein the microcontroller unit controls the winch to operate in the deactivation mode based on receipt of the second radio signal.

2. The system of claim 1, further comprising a display configured to show performance parameters of the winch.

3. The system of claim 1, in which the winch further includes at least one encoder operably coupled to the microcontroller unit.

4. The system of claim 3, in which the microcontroller unit is further configured to count the number of roll-up cycles performed by the winch based on signals sent from the encoder.

5. The system of claim 3, in which the microcontroller unit is further configured to count a deployment distance of the towline based on signals sent from the encoder.

6. The system of claim 3, in which the microcontroller unit is further configured to count a remaining take-off run available for the dolly based on signals sent from the encoder.

7. The system of claim 3, in which the microcontroller unit is further configured to measure a rolling-up speed and/or acceleration of the towline based on signals sent from the encoder.

8. The system of claim 1, further comprising at least one alarm indicator operably coupled to the winch and configured to activate in response to winch safety parameters outside of permitted limits.

9. A method for an unmanned aerial vehicle take-off system having a dolly on which an aircraft is mounted, a towline coupled between the dolly and a winch, a battery operatively coupled to the winch and having a battery status level, and an encoder operatively coupled to both the winch and a microcontroller unit, the method comprising:

initializing the take-off system;

checking the battery status level;

checking a number of roll-up cycles performed by the winch;

deploying the towline from the winch;

incrementing a count of deployed towline distance;

incrementing a take-off run count based on the deployed towline distance;

arming the unmanned aerial vehicle take-off system for take-off;

detecting, with a radio receiver unit communicatively coupled to the microcontroller unit, a first radio signal comprising a take-off command, the first radio signal being sent from a radio transmitter;

operating the winch in an activation mode based on receipt of the first radio signal;

initiating a take-off sequence;

checking a rolling-up speed and/or acceleration of the towline;

checking a remaining take-off run available for the dolly;

operating an elevator channel of the dolly in a nose-up direction to rotate the aircraft;

transmitting a second radio signal in response to operating the elevator channel in the nose-up direction;

detecting, with the radio receiver unit, the second radio signal comprising a lift-up command, the second radio signal sent from the radio transmitter;

operating the winch in a deactivation mode based on receipt of the second radio signal; and     ending the take-off sequence.

10. The method of claim 9, in which the method finishes without starting the take-off sequence if, after checking battery status level, the battery status level is determined to be under a predetermined battery status limit.

11. The method of claim 9, in which the method finishes without starting the take-off sequence if, after checking the number of roll-up cycles performed by the winch, the number of roll-up cycles performed by the winch is determined to be above a predetermined cycle limit.

12. The method of claim 9, in which the unmanned aerial vehicle system further includes at least one alarm indicator configured to indicate that the battery status level is under a predetermined battery status limit and/or to indicate that the number of roll-up cycles performed by the winch is above a predetermined cycle limit.

13. The method of claim 9, further comprising switching the winch to deactivation mode and aborting the aircraft take-off sequence if, after checking the rolling-up acceleration of the towline, the rolling-up acceleration of the towline is outside of a predetermined range of acceleration values.

14. The method of claim 9, further comprising switching the winch to deactivation mode and aborting the aircraft take-off sequence if, after checking the remaining take-off run available for the dolly, the remaining take-off run available for the dolly is under a predetermined distance value.

15. The method of claim 9, in which the method finishes after a predetermined period of time from detecting the second radio signal comprising a lift-up command.

16. The method of claim 9, in which the method returns to the step of checking the rolling-up acceleration of the towline if no second radio signal comprising a lift-up command is detected by the radio receiver unit.

17. The method of claim 9, further comprising switching the winch to the deactivation mode to abort the aircraft take-off sequence if a stop command is detected by the radio receiver unit.

\* \* \* \* \*